(12) United States Patent
Ayyagari et al.

(10) Patent No.: US 7,464,265 B2
(45) Date of Patent: Dec. 9, 2008

(54) METHODS FOR ITERATIVELY DERIVING SECURITY KEYS FOR COMMUNICATIONS SESSIONS

(75) Inventors: Arun Ayyagari, Seattle, WA (US);
Daniel R. Simon, Redmond, WA (US);
Bernard D. Aboba, Bellevue, WA (US);
Krishna Ganugapati, Redmond, WA (US); Timothy M. Moore, Bellevue, WA (US); Pradeep Bahl, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1156 days.

(21) Appl. No.: 10/138,868

(22) Filed: May 3, 2002

(65) Prior Publication Data

US 2003/0208677 A1 Nov. 6, 2003

(51) Int. Cl.
*H04L 9/00* (2006.01)

(52) U.S. Cl. .............. 713/168; 713/155; 713/179; 380/44; 380/46; 380/268; 380/277; 380/284; 726/2

(58) Field of Classification Search ........... 380/277, 380/44, 46, 268, 284; 713/155, 168, 179; 726/2
See application file for complete search history.

(56) References Cited

U.S. PATENT DOCUMENTS

| 4,316,055 | A | | 2/1982 | Feistel |
| 5,454,039 | A | | 9/1995 | Coppersmith et al. |
| 5,491,749 | A | | 2/1996 | Rogaway |
| 5,535,276 | A | * | 7/1996 | Ganesan ................... 713/155 |
| 5,675,652 | A | | 10/1997 | Coppersmith et al. |
| 5,835,597 | A | | 11/1998 | Coppersmith et al. |
| 5,960,086 | A | * | 9/1999 | Atalla ........................ 380/44 |
| 6,148,404 | A | * | 11/2000 | Yatsukawa ................... 726/2 |
| 6,185,304 | B1 | | 2/2001 | Coppersmith et al. |
| 6,189,098 | B1 | * | 2/2001 | Kaliski, Jr. ................. 713/168 |
| 6,192,129 | B1 | | 2/2001 | Coppersmith et al. |
| 6,198,824 | B1 | * | 3/2001 | Shambroom ................ 380/279 |

(Continued)

OTHER PUBLICATIONS

IEEE 802.11i: Part 11: Wireless Medium Access Control (MAC) and Physical Layer (PHY) Specifications: Specification for Enhanced Security, Copyright 2002 IEEE.

(Continued)

*Primary Examiner*—Kim Yen Vu
*Assistant Examiner*—Baotran N To
(74) *Attorney, Agent, or Firm*—Wolf, Greenfield & Sacks, P.C.

(57) ABSTRACT

Disclosed are methods for a client, having established one set of security keys, to establish a new set without having to communicate with an authentication server. When the client joins a group, master session security keys are derived and made known to the client and to the group's access server. From the master session security keys, the access server and client each derive transient session security keys, used for authentication and encryption. To change the transient session security keys, the access server creates "liveness" information and sends it to the client. New master session security keys are derived from the liveness information and the current set of transient session security keys. From these new master session security keys are derived new transient session security keys. This process limits the amount of data sent using one set of transient session security keys and thus limits the effectiveness of any statistical attacker.

39 Claims, 14 Drawing Sheets

U.S. PATENT DOCUMENTS 6,243,470 B1    6/2001    Coppersmith et al.
6,763,468 B2 *    7/2004    Gupta et al. .................... 726/2
6,940,980 B2 *    9/2005    Sandhu et al. .............. 380/282

OTHER PUBLICATIONS

The TLS Protocol, Version 1.0, http://www.ietf.org/rfc/rfc2246.txt?number=2246.

* cited by examiner

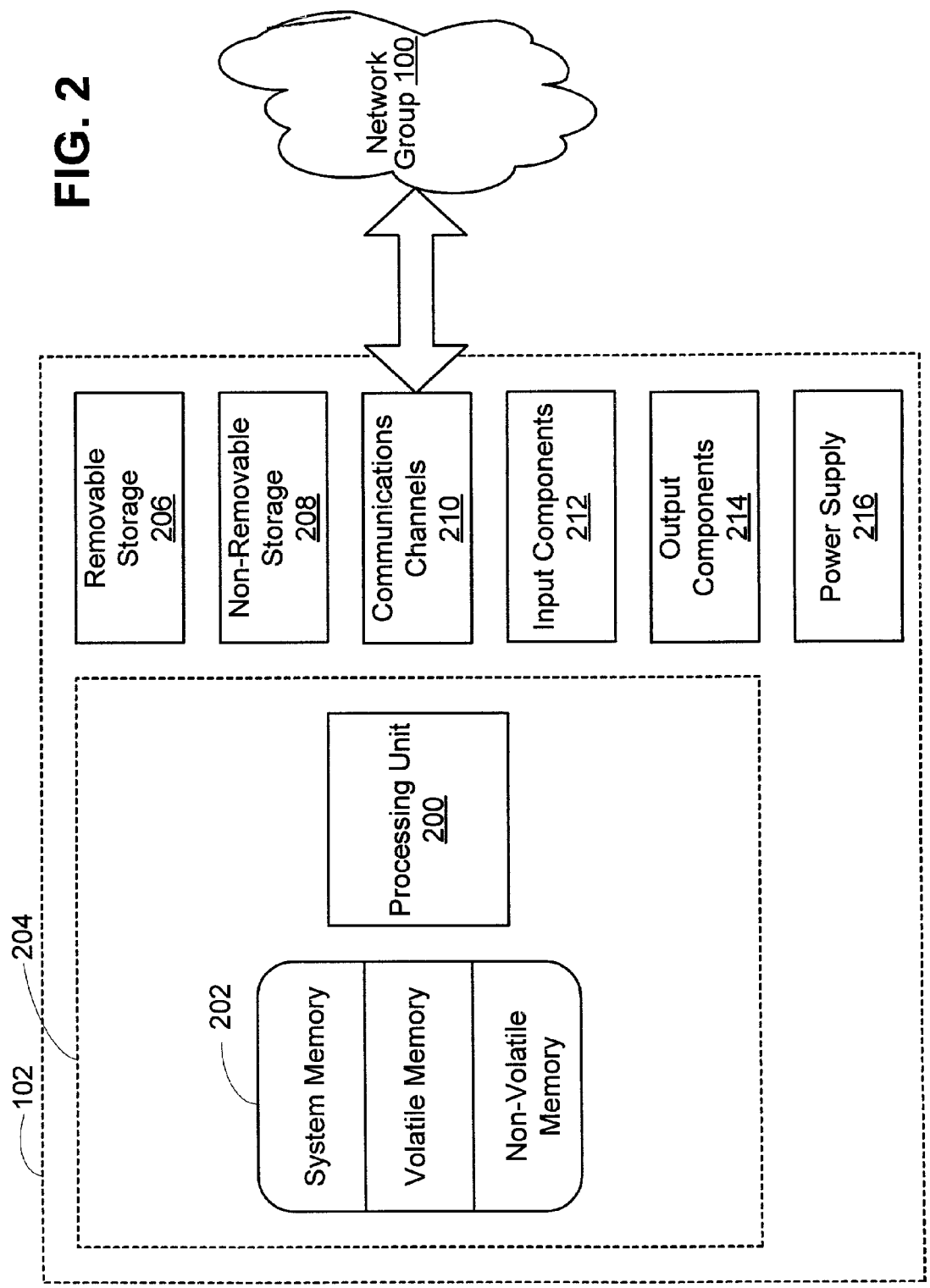

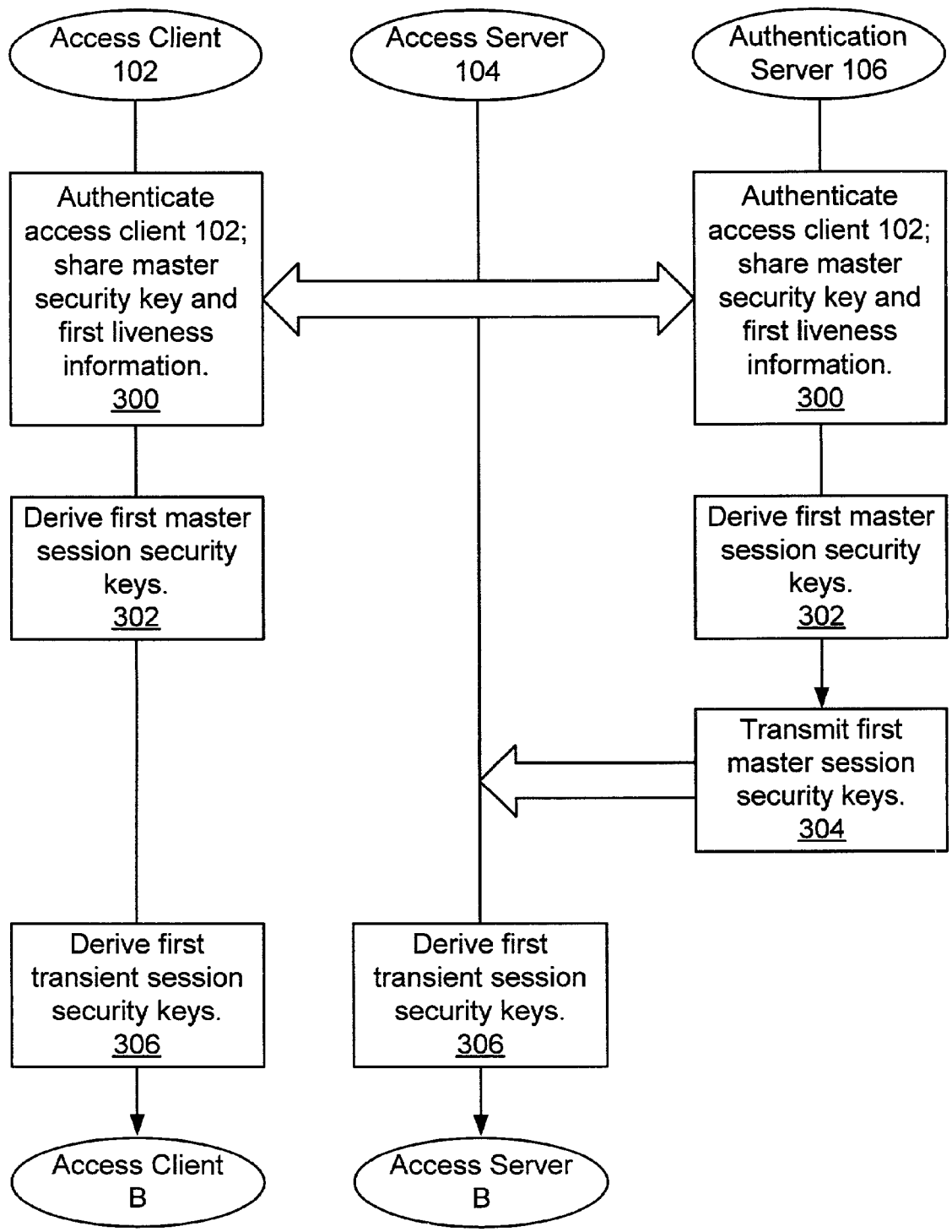

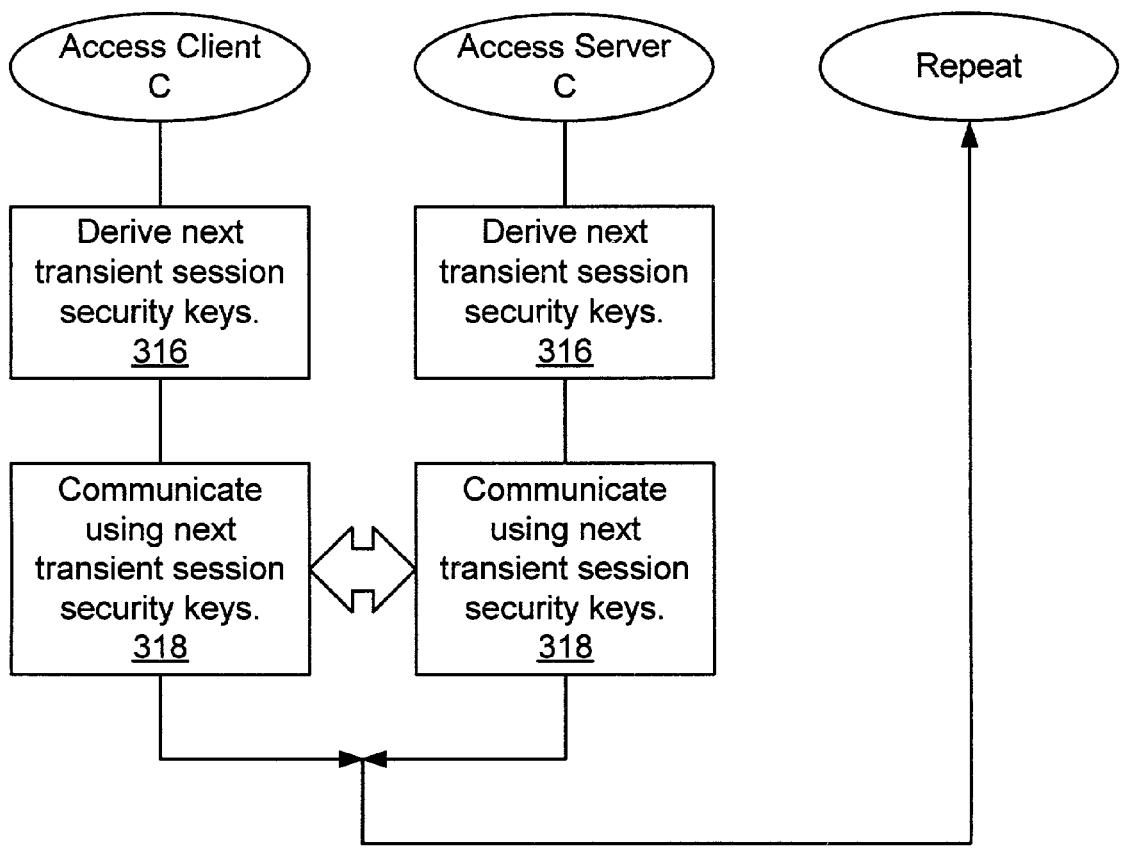

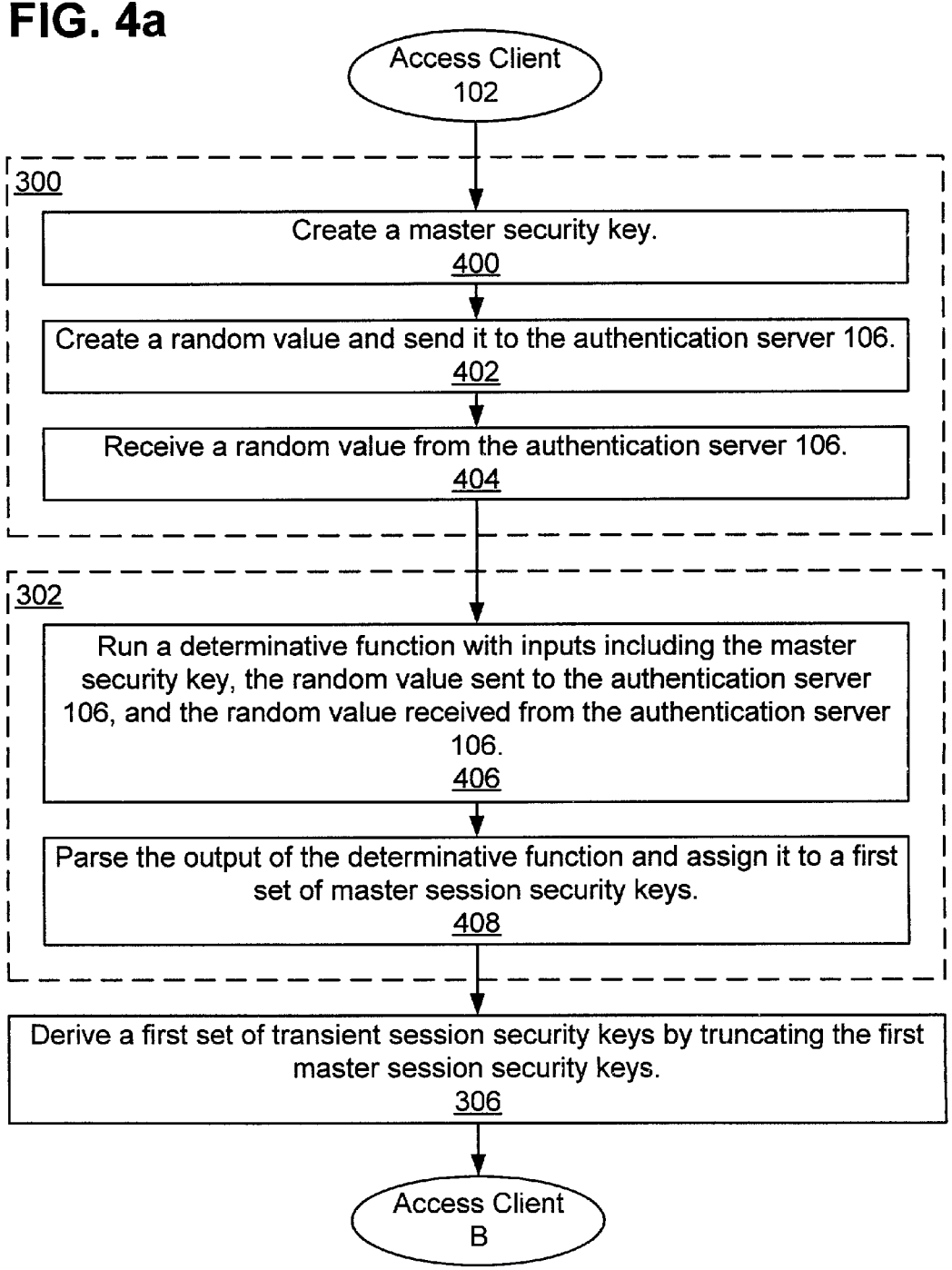

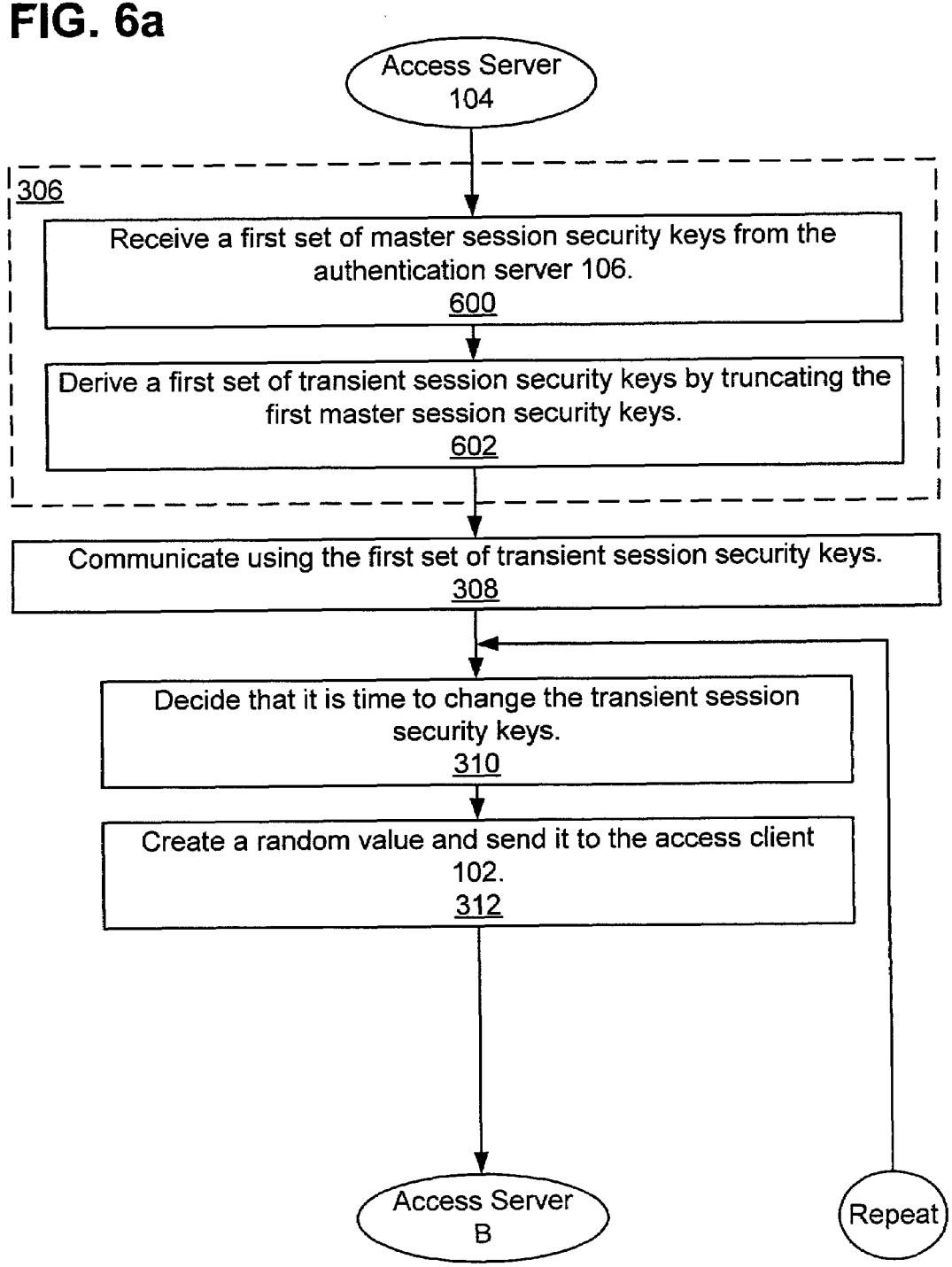

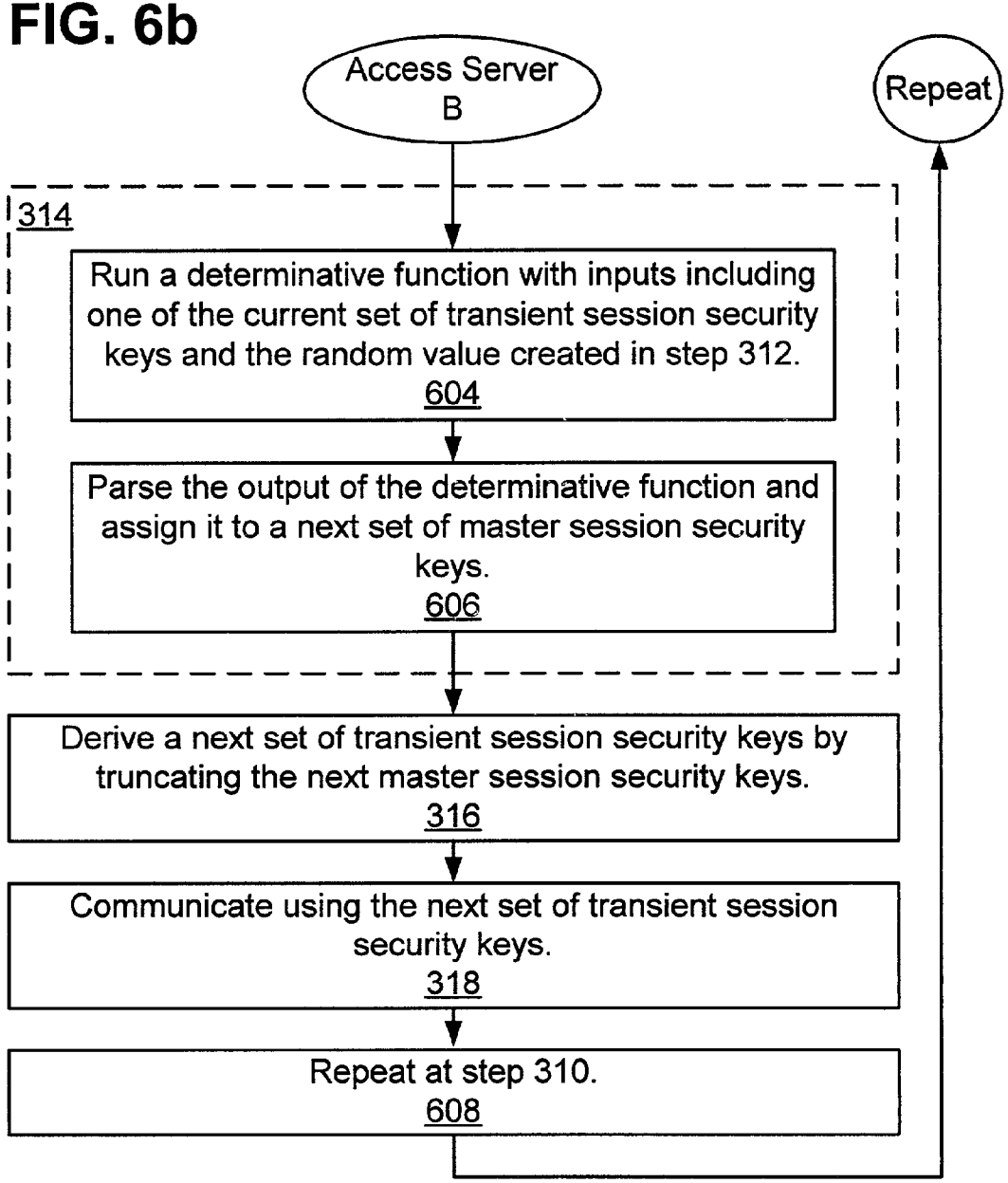

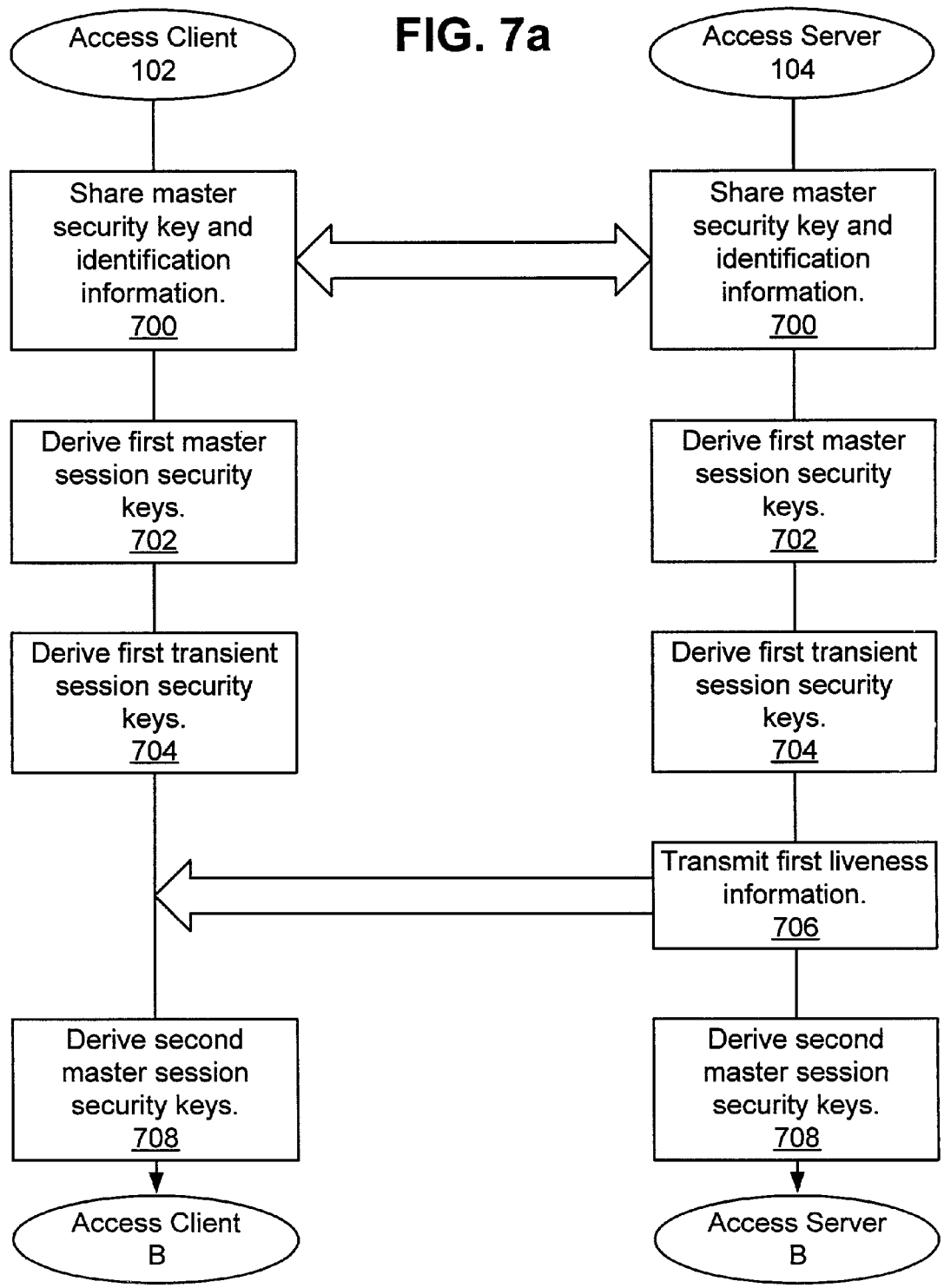

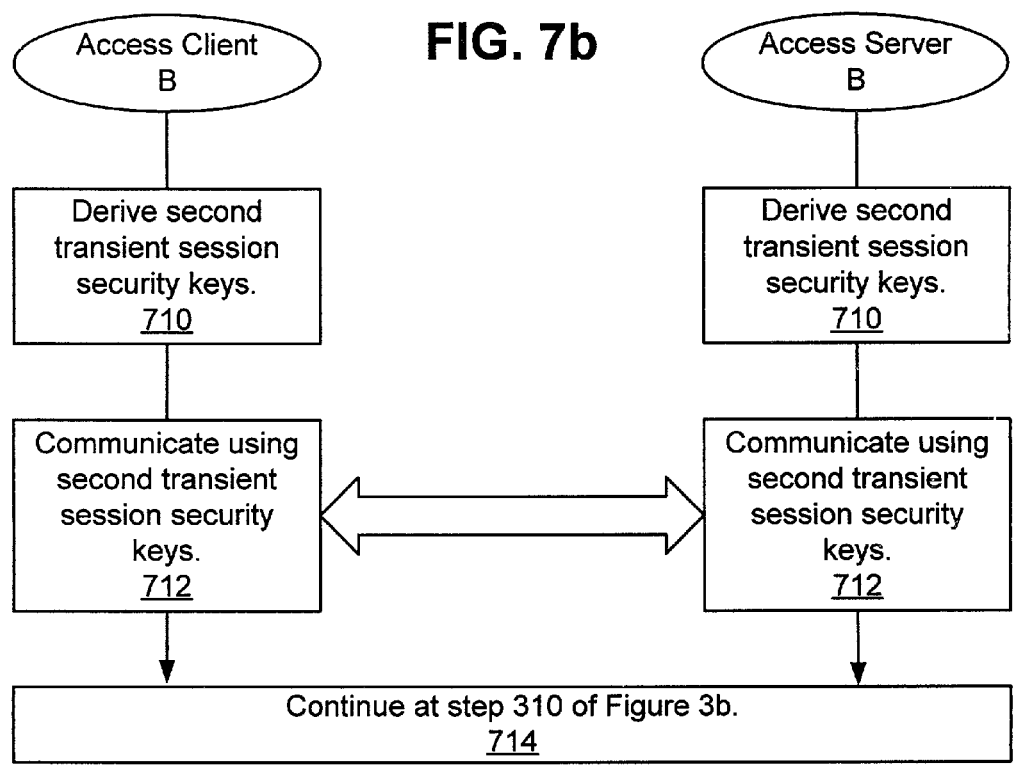

METHODS FOR ITERATIVELY DERIVING SECURITY KEYS FOR COMMUNICATIONS SESSIONS

TECHNICAL FIELD

The present invention is related generally to computer communications, and, more particularly, to deriving security keys for communications sessions.

BACKGROUND OF THE INVENTION

Computer networks are growing larger and are carrying much more sensitive information. For security's sake, computing devices using a network often form themselves into network groups and only communicate sensitive information with other group members. However, the vast majority of network groups are still vulnerable to security attacks. In one form of security attack, an attacker not authorized to join a group enters the group, possibly by impersonating a legitimate group member. Once in the group, the attacker has access to information meant only for legitimate group members. In a second form of attack, an attacker does not join the group, but eavesdrops on communications among group members in order to obtain security codes. With those security codes in hand, the eavesdropper can access sensitive information sent by the group members. These security attacks are especially worrisome to groups that communicate via wireless technologies because it is difficult or impossible to restrict physical access to these groups and to their communications.

These two forms of security attacks are addressed by two major aspects of communications security. First, authentication techniques are employed to ensure that only legitimate group members can join a network group. Authentication techniques are often based upon authentication credentials. In some cases, the authentication credentials include a secret security key shared between a computing device attempting to join a group and an authentication server already in the group. In other cases, the authentication credentials may be based upon public/private key pairs and security certificates. In any case, only after the computing device proves its knowledge of the authentication credentials does the authentication server allow it to join the group.

In a second aspect of communications security, information transmitted among members of a network group is encrypted. In a typical encryption method, the information sender and the receiver first agree upon an information-encoding scheme. The encoding scheme is based upon secret security keys, often, but not always, shared between the sender and the receiver. The sender encrypts the information using the agreed-upon encoding scheme and then sends the encrypted information to the receiver. Upon reception, the receiver decrypts the information using the agreed-upon encoding scheme. Although the encrypted information may still be eavesdropped, the eavesdropper cannot obtain the original information without knowing the security keys.

However, authentication and encryption do not always provide sufficient protection. For example, encrypted information is still subject to a number of attacks, including statistical attacks. In a statistical attack, an eavesdropper analyzes a set of encrypted messages in order to tease out patterns that are associated with the security scheme agreed upon by the sender and the receiver. From the patterns, the eavesdropper may discover the security keys underlying the agreed-upon security scheme and use them to decrypt the encrypted information.

Because of the statistical nature of this method of attack, its accuracy improves with an increasing number of messages analyzed. Thus one approach to frustrate statistical attacks is to limit the amount of information sent using any one security scheme. To do this, the security keys underlying the agreed-upon security scheme may be changed frequently. However, changing the security keys involves significant communications and processing overhead for the sender and the receiver. This overhead becomes an acute problem in exactly those situations where changing the security keys frequently is most useful: in wireless network groups.

A typical wireless network group contains an access server that communicates with all computing devices (also called "stations") in the group and with all stations attempting to join the group. The access server also communicates with an authentication server. The authentication server may be located remotely from the wireless group and may serve several, sometimes hundreds, of wireless groups. When a station attempts to begin a session and join the group, it communicates through the access server to the authentication server. The station and the authentication server attempt to authenticate each other and, if the process is mutually successful, the station joins the wireless group and begins to communicate with the other stations already in the group. If the station terminates the communications session (thus leaving the group) and later wishes to restart another session (i.e., rejoin the group), the station repeats the mutual authentication process with the authentication server.

This mutual authentication process resets the security keys used by the station and by the authentication server. However, it is not feasible to use a station-to-authentication server method to frequently change the security keys. This would involve a bothersome interruption in communications while the station drops out of the communications session and then re-authenticates itself to the authentication server. Also, a typical authentication server is responsible for simply too many stations to be able to efficiently process frequent security key changes with each of them.

What is needed is a way for a computing device in a network group to change its security keys without communicating with an authentication server.

SUMMARY OF THE INVENTION

In view of the foregoing, the present invention provides a method for a computing device (here called an "access client"), having established a first set of security keys upon being admitted into a network group, to establish a new set of security keys. Using the first set of security keys as input and "liveness" information (e.g., a random value or a timestamp) as another input, the access client derives the new set of security keys without having to communicate with an authentication server.

In a first situation, the access client is authenticated by an authentication server when the client joins a network group. During this authentication process, a master security key is created that is known both to the client and to the authentication server. From that master security key are derived master session security keys. The authentication server transmits the master session security keys to the group's access server. Then, the access server and the client each derive transient session security keys from the master session security keys. The transient session security keys embody the client's communications security scheme, that is to say, they are used for authentication and encryption. When it seems desirable to change the client's security scheme, the access server creates liveness information and sends it, encrypted, to the client.

Then the client and the access server in parallel create new master session security keys based upon the liveness information and upon the transient session security keys previously derived. From these new master session security keys, the client and the access server, as before, derive new transient session security keys. The new transient session security keys are then used for authentication and encryption until the process is repeated and a newer set is derived. This process may be repeated as often as desired to limit the amount of data sent using any one particular set of transient session security keys and thus to limit the effectiveness of any statistical attacker.

In a second situation, the master security key is not created during the authentication process. Instead, it is a secret already shared between the access client and the access server. From that shared secret master security key, a first set of transient session security keys is derived, as explained above. However, this set does not include liveness information and so is not ideally secure. Instead of using this first set for communications, it is rather used as input, along with liveness information, to create a second set of transient session security keys. This second set is then used by the client in its communications. When the time comes to change the client's transient session security keys, the process of iterative derivation proceeds in the same manner as in the first situation.

In another aspect of the present invention, the access server decides when the current transient session security keys should be changed, its decision possibly based upon the passage of time or upon the amount of data sent using the current set of transient session security keys. The access server generates liveness information and transmits it to the access client. The reception of the liveness information triggers the iterative derivation of the next set of transient session security keys.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 2 is schematic diagram generally illustrating an exemplary computing system that supports the present invention;

FIGS. 3a through 3c together form a dataflow diagram showing the information passed and the operations performed when iteratively deriving new security keys according to a first embodiment of the present invention;

FIGS. 4a and 4b together form a flow chart illustrating an exemplary method performed by an access client when iteratively deriving new security keys according to a first embodiment of the present invention;

FIGS. 6a and 6b together form a flow chart illustrating an exemplary method performed by an access server when iteratively deriving new security keys according to a first embodiment of the present invention;

FIGS. 7a and 7b together form a dataflow diagram showing the information passed and the operations performed when iteratively deriving new security keys according to a second embodiment of the present invention.

DETAILED DESCRIPTION OF THE INVENTION

Figure 1:
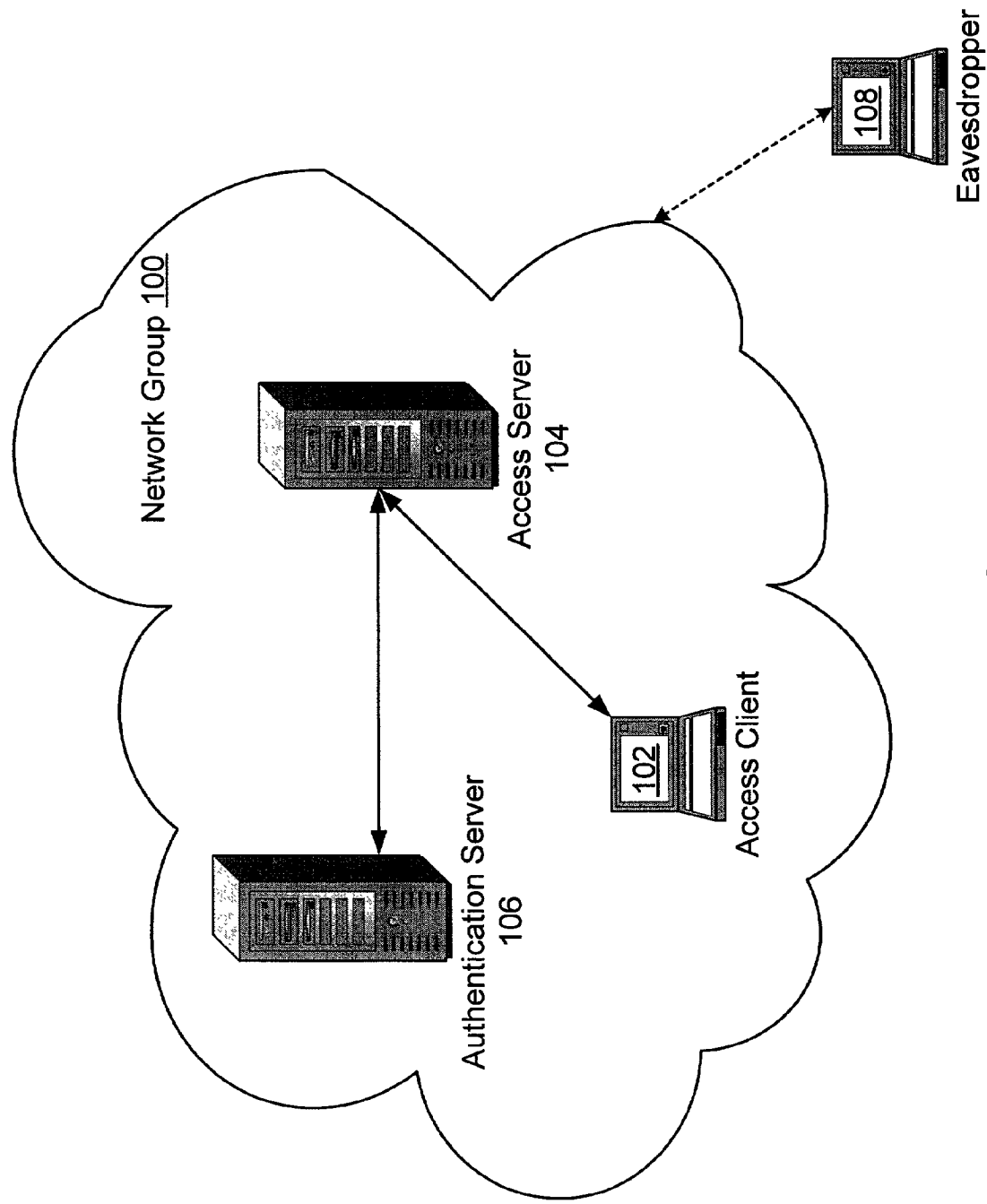
FIG. 1 is a block diagram showing an exemplary network group containing an access client, an access server, and an authentication server and, outside of the group, an eavesdropper.

Turning to the drawings, wherein like reference numerals refer to like elements, the present invention is illustrated as being implemented in a suitable computing environment. The following description is based on embodiments of the invention and should not be taken as limiting the invention with regard to alternative embodiments that are not explicitly described herein.

In the description that follows, the present invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the device in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

The present invention provides a method for an access client, having established a first set of security keys upon being admitted by an authentication server into a network group, to establish a new set of security keys without having to communicate further with the authentication server. In FIG. 1, members of a network group 100 include an access client 102, an access server 104, and an authentication server 106. The group 100 may also contain numerous other access clients 102, but these are not shown for clarity's sake. To join the group 100, the access client 102 communicates with the authentication server 106, the communications passing through the access server 104. If the access client 102 successfully authenticates itself to the authentication server 106, then the access client 102 is allowed to join the group 100. While the access server 104 is local to the group 100, the authentication server 106 may be remote and may serve several, maybe hundreds, of groups 100.

During the authentication process, the access client 102 and the authentication server 106 mutually create a set of security keys to protect the messages passed among the access client 102 and the other members of the network group 100. Protection is necessary because these messages are subject to interception by a malicious eavesdropper 108. The eavesdropper 108 intercepts the messages and applies statistical methods to them in an attempt to discover the security keys used to protect them. Because of the statistical nature of this attack, its accuracy improves with an increasing number of messages analyzed. To frustrate this statistical attack, the access client 102 should quickly change the security keys before the eavesdropper 108 can intercept enough messages to discover those security keys. In the past, the access client 102 could change the security keys by re-authenticating itself to the authentication server 106. The access client 102 can trigger re-authentication either by explicitly requesting it, or it can leave the group 100 and then attempt to rejoin it. However, re-authentication is not optimal as it interrupts communications and places too large a burden upon the authentication server 106, especially when it must serve many groups 100. The methods of the present invention allow the access client 102 to work together with the access server 104 to quickly change the security keys without having to invoke the services of the authentication server 106.

The access client 102 of FIG. 1 may be of any architecture. FIG. 2 is a block diagram generally illustrating an exemplary computer system that supports the present invention. The computer system of FIG. 2 is only one example of a suitable environment and is not intended to suggest any limitation as to the scope of use or functionality of the invention. Neither should the access client 102 be interpreted as having any dependency or requirement relating to any one or combination of components illustrated in FIG. 2. The invention is operational with numerous other general-purpose or special-purpose computing environments or configurations. Examples of well known computing systems, environments, and configurations suitable for use with the invention include, but are not limited to, personal computers, servers, hand-held or laptop devices, multiprocessor systems, microprocessor-based systems, set-top boxes, programmable consumer electronics, network PCs, minicomputers, mainframe computers, and distributed computing environments that include any of the above systems or devices. In its most basic configuration, the access client 102 typically includes at least one processing unit 200 and memory 202. The memory 202 may be volatile (such as RAM), non-volatile (such as ROM or flash memory), or some combination of the two. This most basic configuration is illustrated in FIG. 2 by the dashed line 204. The access client 102 may have additional features and functionality. For example, the access client 102 may include additional storage (removable and non-removable) including, but not limited to, magnetic and optical disks and tape. Such additional storage is illustrated in FIG. 2 by removable storage 206 and non-removable storage 208. Computer-storage media include volatile and non-volatile, removable and non-removable, media implemented in any method or technology for storage of information such as computer-readable instructions, data structures, program modules, or other data. Memory 202, removable storage 206, and non-removable storage 208 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the access client 102. Any such computer-storage media may be part of the access client 102. The access client 102 may also contain communications channels 210 that allow the device to communicate with other devices. Communications channels 210 are examples of communications media. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media, such as wired networks and direct-wired connections, and wireless media such as acoustic, RF, infrared, and other wireless media. The term "computer-readable media" as used herein includes both storage media and communications media. The access client 102 may also have input devices 212 such as a keyboard, mouse, pen, voice-input device, touch-input device, etc. Output devices 214 such as a display, speakers, and printer may also be included. All these devices are well know in the art and need not be discussed at length here.

Figure 3B:
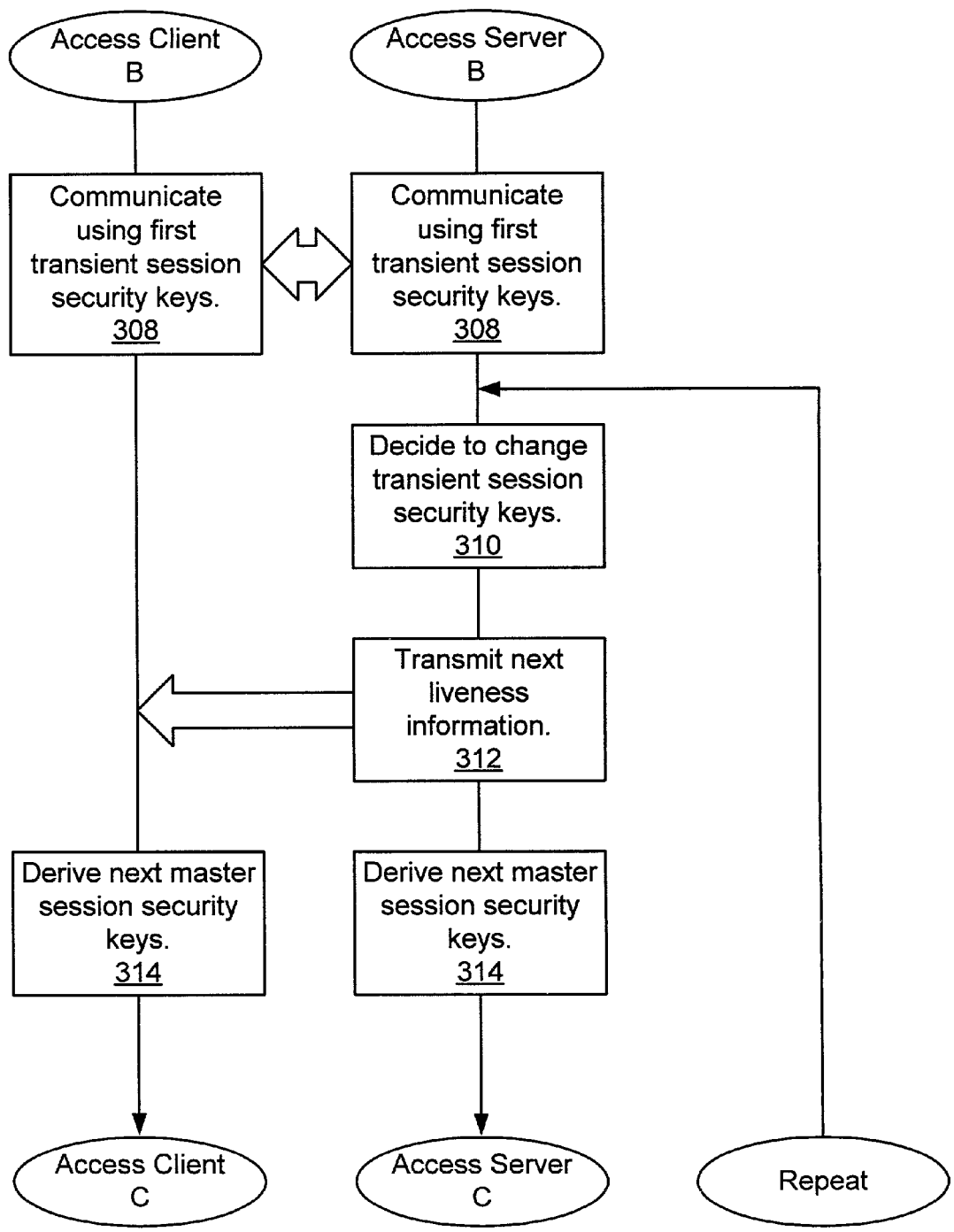

To illustrate aspects of the present invention, FIGS. 3a through 3c present an overview of exemplary information passed and operations performed when an access client 102 works with an access server 104 to iteratively derive new security keys based upon a set of security keys established between the access client 102 and an authentication server 106. This situation may arise, for example, when the network group 100 is based upon the IEEE (Institute of Electrical and Electronics Engineers) 802.11 wireless standard. Further details behind the steps of FIGS. 3a through 3c are presented in the discussions accompanying FIGS. 4 through 6. Note that in these Figures, and in all the Figures that follow, specific implementation choices are made for purposes of illustration. These details are not to be taken as limiting the scope of the present invention.

In step 300, the access client 102 is authenticated by the authentication server 106 and admitted to the network group 100. The authentication process results in a master security key shared between the access client 102 and the authentication server 106. Many known authentication methods may be used in step 300, and many methods may be used to generate the master security key. The master security key may, for example, be cooperatively generated using Diffie-Hellman techniques or may, for another example, simply be generated by one party and sent to the other. In any case, accompanying the master security key is some shared "liveness" information. This may include a timestamp or random value. The liveness information is used, as discussed below in reference to step 302, in conjunction with the master security key to make the eavesdropper 108's statistical attack less likely to succeed.

In step 302, a first set of master session security keys is derived from the master security key in conjunction with the shared liveness information. Note that this derivation can occur independently on the access client 102 and on the authentication server 106 because step 300 provided each device with all the information needed to perform the derivation of step 302. The use of the shared liveness information in the derivation makes the master session security keys different every time the access client 102 authenticates itself to the authentication server 106. Were this not the case, the access client 102 would use the same security keys every time it rejoined the network group 100. Knowing this, the eavesdropper 108 could resume its statistical attack every time the access client 102 rejoins the group 100, adding newly intercepted messages to its analysis of messages intercepted during the access client 102's previous sessions.

Until this point, the access server 104 is not involved. Actually, the access server 104 serves to pass messages between the access client 102 and the authentication server 106 during the authentication process, but, in the general case, the access server 104 cannot interpret these messages. However, after the authentication process is complete, the situation of the access server 104 changes. The bulk of the access client 102's messaging while in the network group 100 is with other group members, and that messaging is mediated by the access server 104. Different access clients 102 may use different communications techniques, differences that must be accommodated by the access server 104 but that do not concern the authentication server 106. For these reasons, and to allow the access server 104 to take an active role in changing security keys (in steps 310 through 316 as discussed below), the authentication server 106 in step 304 sends the first set of master session security keys it derived in step 302 to the access server 104 in a secure manner. At this point, the access client 102 is a member of the group 100, and the work of the authentication server 106 is complete. Note that while the access server 104 has a copy of the first set of master session security keys, for security's sake it does not have access to the master security key of step 300. Therefore, the access server 104 cannot step into the role of the authentication server 106 and repeat the authentication process of step 300 in order to change the security keys.

The first set of master session security keys is not used directly in securing communications. Instead, in step 306, the access client 102 and the access server 104 in parallel use the first set of master session security keys to derive a first set of transient session security keys. These transient session security keys usually include encryption keys (which may be either shared or may be a pair of one-way keys) and authentication keys. In step 308 of FIG. 3b, the transient session security keys having finally been set up, the access client 102 begins to use them to encode its communications with other members of the group 100.

Of course, as the access client 102 begins in step 308 to communicate using the first set of transient session security keys, the eavesdropper 108 also begins in step 308 to intercept the encoded messages and to subject them to statistical attack in an attempt to discover the first set of transient session security keys (not shown). To frustrate this attack, the access server 104 every now and again decides, in step 310, to change the security keys. (In other embodiments, this decision may come from the access client 102.) The access server 104's decision that the time has come may be based on many things, such as a given amount of time passing since the current set of security keys was derived, or a given amount of data having been transmitted using the current set of security keys, or a random event occurring. In any case, the access server 104 generates new liveness information (called "next" in FIG. 3b to distinguish it from the first liveness information generated during the authentication process of step 300) and shares it with the access client 102 in step 312.

In steps 314 and 316, the access client 102 and the access server 104 in parallel generate a new set of security keys. This process is similar to that used in steps 300 through 306 to generate the first set of security keys. However, remember that the access server 104 does not have access to the master security key of step 300. To make up for that lack, the access client 102 and the access server 104 use instead one of the current set of transient session security keys (derived in step 306) to take the place of the master security key. (Which key is used is not important as long as the access client 102 and the access server 104 use the same key. In other embodiments, more than one transient session security key may be used here.) In step 314, from the current transient session security key and the next liveness information is derived this next set of master session security keys. Step 316 parallels step 306, here deriving the next set of transient session security keys from the next set of master session security keys. Note that the derivation techniques used in steps 314 and 316 need not be identical to the derivation techniques used in steps 302 and 306, although for efficiency's sake they most likely will be.

The access client 102 and the access server 104 use the recently derived next set of transient session security keys in step 318 to communicate within the network group 100. The communications continue in step 318 until either the access client 102 leaves the group 100 or the access server 104 decides to change the security keys yet again and returns to step 310. Note that if the access client 102 leaves the group 100, then when it wishes to rejoin the group 100, it re-authenticates itself to the authentication server 106 by beginning at step 300. This "big reset" with the authentication server 106 provides a high level of security for the group 100, while the "little reset" beginning in step 310 with the access server 104 provides adequate security because the access client 102 has already been authenticated into the group 100. The present invention allows this "little reset" to be used to enhance security during the access client 102's session in the group 100.

Figure 4B:
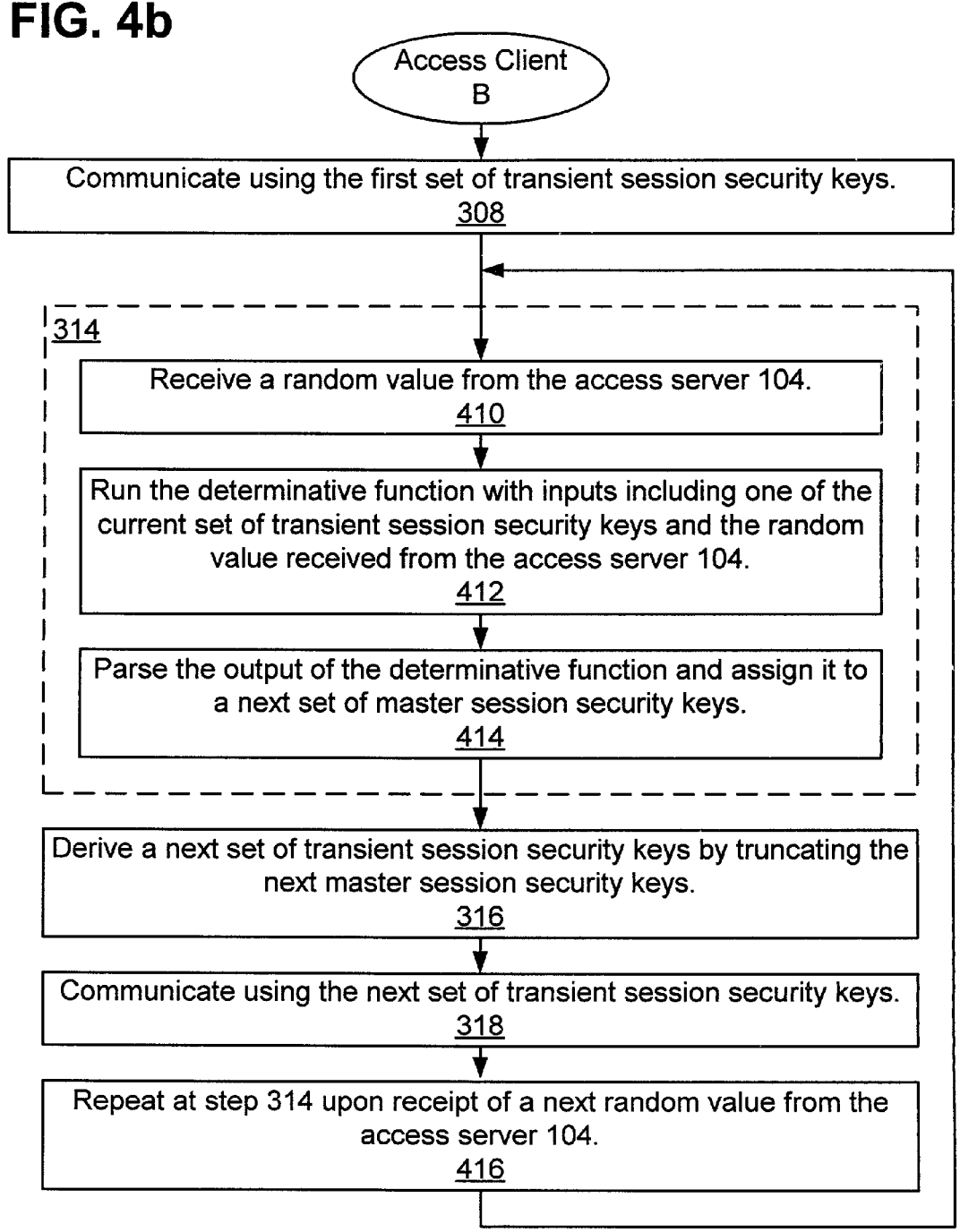

FIGS. 4a and 4b present further details, from the point of view of the access client 102, of the methods of FIGS. 3a through 3c. In the particular implementation of FIGS. 4a and 4b, the first liveness information consists of two random values, one produced by the access client 102 and one produced by the authentication server 106, which are exchanged in steps 402 and 404.

The liveness information (the two exchanged random values) and the master security key are passed as inputs to a determinative function in step 406. This function is called "determinative" because the outputs of the function are completely determined by the inputs: there is no randomness in the function's operation. This property is important because this determinative function is run separately on the access client 102 and on the authentication server 106 (see step 302 of FIG. 3a). If these two devices were to produce different outputs when they ran the determinative function, then the security keys derived from the function would not match and could not be used for intercommunication.

In addition to being determinative, for security's sake the function of step 406 should be inherently irreversible. That is to say, knowing the function's outputs, it should be very difficult or impossible to determine its inputs. Hashes form a well known class of functions that are both determinative and inherently irreversible and, as such, they are often used in encryption and authentication calculations. As one embodiment of the determinative function of step 406, consider the pseudo-random function (PRF) used with the well known TLS (Transport Level Security) protocol. PRF combines the results of two well known hash functions, MD5 (Message-Digest algorithm 5) and SHA-1 (Secure Hash Algorithm 1). PRF uses two hash functions in order to preserve security just in case someone discovers how to reverse one of the two hash functions.

These two hash functions produce outputs that may be too short to be optimum for security. SHA-1 produces 20-byte outputs, and MD5 produces 16-byte outputs. Therefore, for each of the two hash functions, define a "data expansion function" that uses the hash function to produce output of arbitrary length. For SHA-1, the data expansion function is P_SHA-1:

$$P\_SHA\text{-}1(\text{master security key, liveness}) = SHA\text{-}1(\text{master security key}, A(1) + \text{liveness}) +$$

$$SHA\text{-}1(\text{master security key}, A(2) + \text{liveness}) +$$

$$SHA\text{-}1(\text{master security key}, A(3) + \text{liveness}) + \ldots$$

where $A(0)$=liveness; $A(i)$=SHA-1 (master security key, $A(i-1)$); and the "+" sign indicates string concatenation. The definition of the data expansion function P_MD5 is similar to the above definition with "MD5" replacing "SHA-1" wherever it appears. The data expansion functions are iterated to as many steps as necessary to produce output of a desired length. The desired output length is set as an implementation option. For the present embodiment described in the Figures, the desired output length for each hash function is 128 bytes. P_SHA-1 is iterated out to $A(7)$ for a total output length of 140 bytes (each iteration increasing the output length by 20 bytes). The output is then truncated to 128 bytes. Each iteration of P_MD5 produces 16 bytes, so iterating it out to $A(8)$ produces the desired 128 bytes with no truncation.

Having chosen the hash functions and having iterated their data expansion functions out to the desired output length, step 406 continues by applying PRF. PRF takes as inputs the master security key, a label (a pre-determined ASCII string), and the liveness information exchanged in steps 402 and 404. PRF is defined to be the exclusive bit-wise OR (XOR) of the output of the two hash data expansion functions, P_MD5 and P_SHA-1:

$$PRF(\text{master security key}, \text{label}, \text{liveness}) = P\_MD5(S1, \text{label} + \text{liveness})$$
$$XOR$$
$$P\_SHA\text{-}1(S2, \text{label} + \text{liveness})$$

where S1 is the first half of the master security key, measured in bytes, and S2 is the second half of the master security key. (If the master security key's length is odd, then its middle byte is both the last byte of S1 and the first byte of S2). As P_MD5 and P_SHA-1 are iterated to produce 128-byte outputs, the output of PRF is also 128 bytes.

Step 408 takes the 128-byte output of PRF and divides it into four 32-byte master session security keys. Then step 306 takes each of the master session security keys and truncates it to the length required by the authentication and encryption protocols being used. The truncated result is one of the new set of transient session security keys. The mechanics of the truncation are well defined for each protocol. The IEEE 802.11 Wired Equivalent Privacy protocol, for example, allows for 40-bit and 104-bit transient session security keys.

Figure 5:
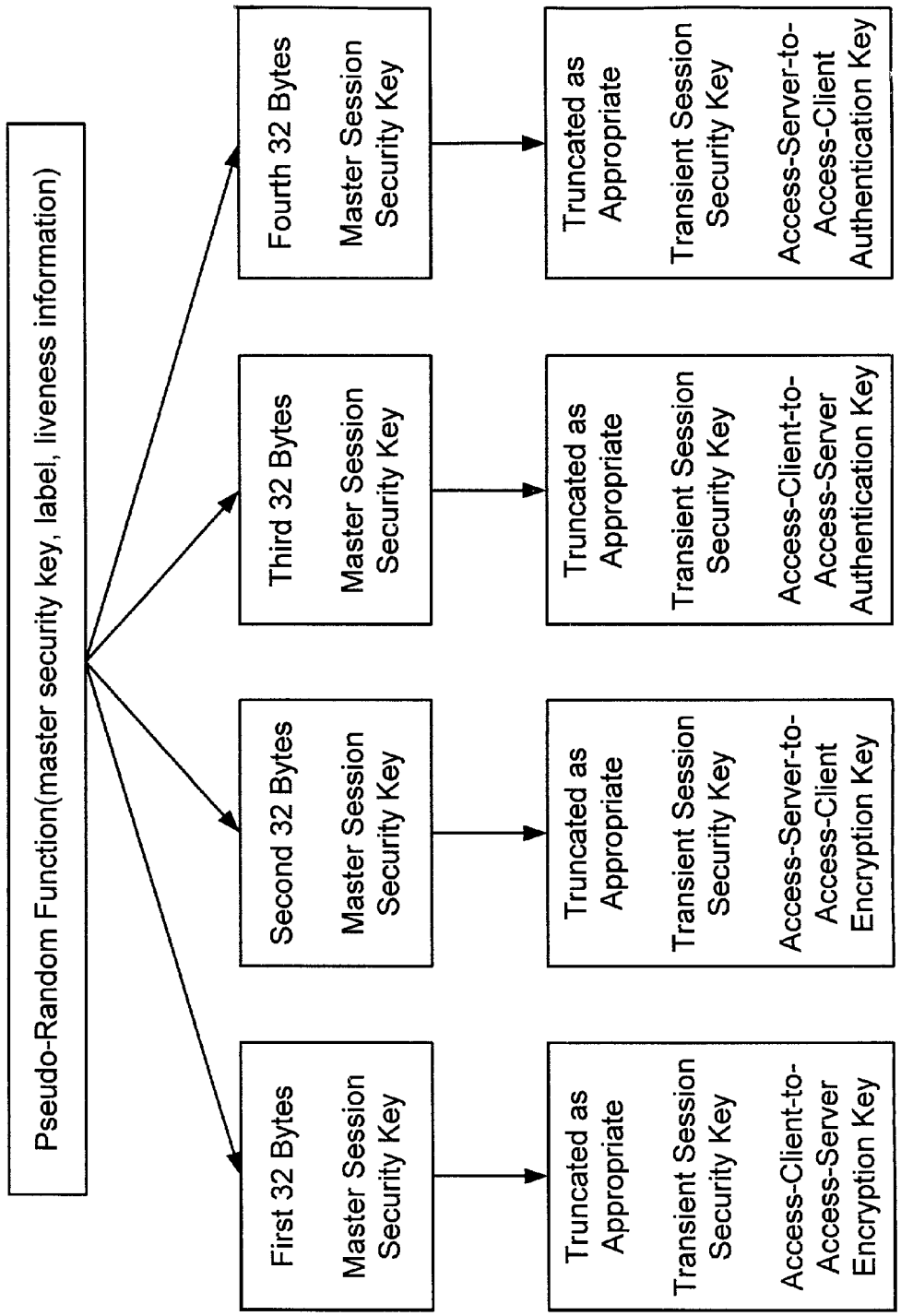
FIG. 5 is a data structure diagram showing one way in which transient session security keys are ultimately derived from a master security key.

FIG. 5 follows the data from PRF output to a new set of four transient session security keys. In FIG. 5's example, each transient session security key is only used in one direction: the first key is used in step 308 to encrypt data sent by the access client 102 to the access server 104, and the second key is used to encrypt data sent by the access server 104 to the access client 102. In other embodiments, one key is used for encrypting data in both directions. In that case, the first key of FIG. 5 may be used for all encryptions, and the second key may be ignored.

After using the first set of transient session security keys for communicating in step 308, the access client 102 receives, in step 410, an indication that the access server 104 wants to change the security keys. The indication includes new liveness information, in FIG. 4b said to be a random value generated by the access server 104. In step 412, the access server 102 runs a determinative function. As mentioned above, this is most likely the same determinative function as used in step 406 to derive the first set of master session security keys, but need not be the same as long as the access client 102 uses the same determinative function in this step as is used by the access server 104 in the parallel step (see step 604 of FIG. 6b). If PRF is used here, then it is run in a manner similar to that described above with reference to step 406, but instead of using the master security key as one of the inputs, one of the current set of transient session security keys is used. Also, of course, the liveness information just received from the access server 104 is used as another input. The rest of the procedure follows that described above: from the output of PRF come the next set of master session security keys (step 414) and then the next set of transient session security keys (step 316). These latter are used for communications in step 318 until the whole process is repeated by returning to step 410 and receiving even newer liveness information from the access server 104. The process of periodically deriving a new set of transient session security keys repeats until the access client 102 leaves the network group 100.

Note that the methods of the present invention allow the security keys to be changed without ever interrupting communications between the access client 102 and the access server 104. The access client 102 and the access server 104 can continue to use the current set of transient session security keys until the entire process of deriving the new set of keys is complete. Upon completion of the derivation process in step 316, the access client 102 begins step 318 by indicating to the access server 104 that it is ready to use the new security keys.

Note also that the new set of security keys is derived in parallel on the access client 102 and on the access server 104. This parallel derivation avoids the possible insecurities of deriving the new security keys on one device and then transmitting them to the other device. Parallel derivation is possible because the two devices share input information and use the same techniques in deriving the next set of security keys. Thus, the methods of operation performed by the access server 104, as detailed in FIGS. 6a and 6b, are very similar to the methods of operation performed by the access client 102 and just described in relation to FIGS. 4a and 4b. Only the differences between the two methods are discussed here.

The first difference comes right at the beginning of the methods. While the access client 102 and the authentication server 106 share the master security key, and from that key, along with liveness information, derive the first set of master session security keys (steps 400 through 408 of FIG. 4a), the access server 104 does not have access to the master security key. Thus, it cannot derive the first set of master session security keys. Instead, in step 600, the access server 104 receives the first set of master session security keys, sent to it by the authentication server 106 or by the access client 102 in a secure manner. With that set in hand, the access server 104 derives the first set of transient session security keys in step 602, paralleling the access client 102's step 306. Now that both devices have derived the same set of transient session security keys, they can use them to communicate with each other in step 308.

In the embodiment of FIGS. 3 through 6, the next difference comes because the access server 104, rather than the access client 102, decides, in step 310, that the time has come to change the security keys. As noted above in the discussion of FIGS. 3a through 3c, this decision may be based upon a passage of time, upon an amount of data sent between the two devices, or upon any other criteria that the access server 104 chooses to use. In step 312, the access server 104 creates new liveness information and sends it to the access client 102. The contents of the liveness information are mostly unimportant, but they should include some randomness for security's sake. This sending of the liveness information triggers the derivation of the next set of transient session security keys, in steps 410 through 316 of FIG. 4b on the access client 102, and, similarly, in steps 604 through 316 of FIG. 6b on the access server 104.

One final difference between the methods of operation of the access client 102 and the access server 104 is mentioned above in reference to step 318 of FIG. 4b. Because the access server 104 begins the process of iteratively deriving the next set of transient session security keys, the access client 102 decides when it ready to begin using the next set. The access server 104 continues to use the old set of security keys until the access client 102 indicates its readiness to enter step 318 and use the next set.

FIGS. 7 and 8 show how the methods of the present invention can be applied to a slightly different scenario than the one discussed in reference to FIGS. 3 through 6. This situation may arise when the network group 100 does not support end-to-end authentication between the access client 102 and the authentication server 106 via the access server 104 using the IEEE 802.1x protocol. For purposes of the present discussion, the important difference is that instead of a master security key derived during an authentication process, here the access client 102 and the access server 104 already share a master security key (step 700). They also share some identification information, such as each other's Media Access Control hardware address. How they come to share the master security key and identification information is beyond the scope of the present discussion, but numerous offline methods are well known.

Because they share the master security key and the identification information from the beginning, the access client 102 and the access server 104 can operate in this situation even more closely in parallel than in the situation of FIGS. 3 through 6. Indeed, FIGS. 8a and 8b, which give the details behind the operations of FIGS. 7a and 7b, apply to both the access client 102 and to the access server 104.

Figure 8A:
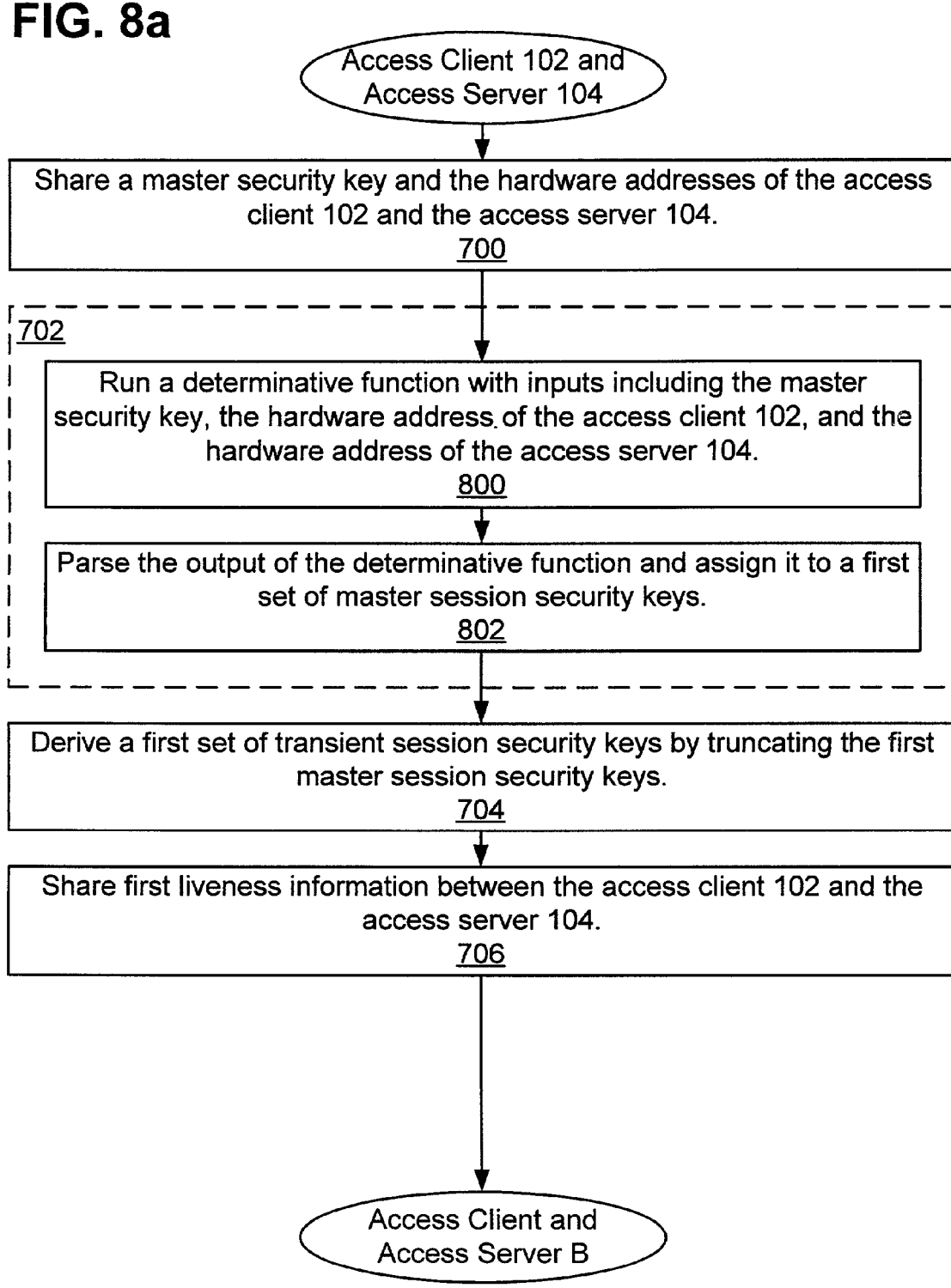
FIGS. 8a and 8b together form a flow chart illustrating an exemplary method performed by an access client and by an access server when iteratively deriving new security keys according to a second embodiment of the present invention.

In steps 800 through 704 of FIG. 8a, the access client 102 and the access server 104 each derive a first set of transient session security keys from the shared master security key and the shared identification information. The techniques used are the same as those used in steps 406 through 306 of FIG. 4a. However, unlike in the situation of FIGS. 3 through 6, the first set of transient session security keys is based on the identification information, not on shared liveness information. Therefore, the first set of transient session security keys derived in step 704 are always the same. That makes them less than ideal from a security standpoint. Because of this, these keys are not used for communications. Rather, the devices share liveness information in step 706 and immediately proceed, in steps 804 through 710 of FIG. 8b, to derive a next set of security keys based upon both the first set and upon the shared liveness information. This set of transient session security keys is suitably secure and is used for communications in step 712.

Figure 8B:
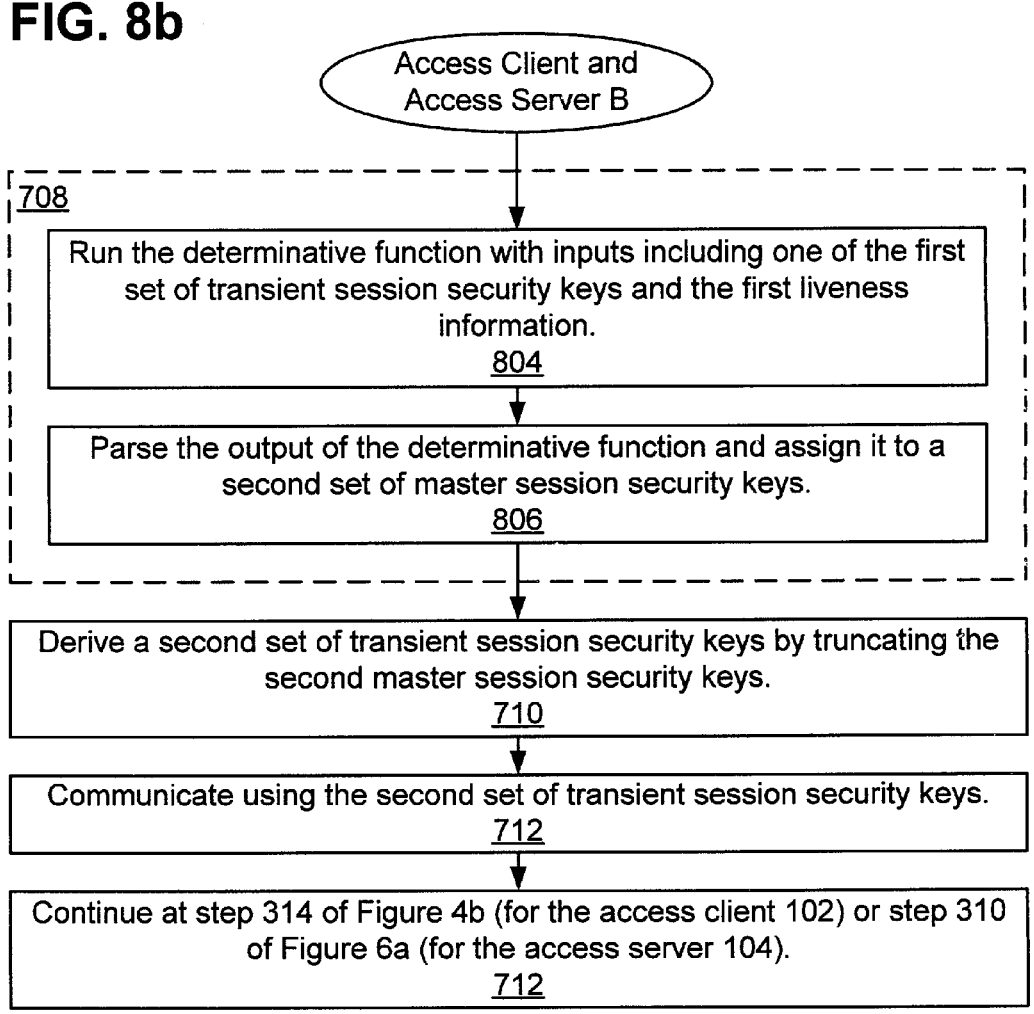

In step 712 of FIG. 8b, the devices in the situation of FIGS. 7 and 8 are in a condition similar to that of the devices in step 308 of the situation of FIGS. 3 through 6. In both cases, the devices are securely communicating. When the time comes to change the security keys, new liveness information is shared, and a new set of security keys is derived from the old set and from the new liveness information.

In view of the many possible embodiments to which the principles of the present invention may be applied, it should be recognized that the embodiments described herein with respect to the drawing figures are meant to be illustrative only and should not be taken as limiting the scope of the invention. Those of skill in the art will recognize that some implementation details, such as key sizes and message formats, are determined by the protocols chosen for specific situations and can be found in published standards. Although the invention is described in terms of software modules or components, some processes, especially encryption methods, may be equivalently performed by hardware components. Therefore, the invention as described herein contemplates all such embodiments as may come within the scope of the following claims and equivalents thereof.

We claim:

1. In a computing environment with an access client and an access server being members of a network group, a method for the access client to communicate with the access server the method comprising:

communicating with an authentication server via the access server to authenticate the access client to the authentication server and establish a master security key known to the access client and the authentication server;

deriving, using at least one first function, a first transient session security key based on the master security key and first liveness information;

communicating with the access server using the first transient session security key;

after communicating with the access server using the first transient session security key, deriving, using at least one second function, a second transient session security key based on the first transient session security key and second liveness information, the second transient session security key being derived without re-authenticating the access client to the authentication server; and communicating with the access server using the second transient session security key.

2. The method of claim 1 wherein the first function and the second function comprise a same function.

3. The method of claim 1 wherein the first function comprises taking an exclusive bit-wise OR of a first hash function and a second hash function, with inputs to the first hash function comprising a first half of the master security key and the first liveness information, and with inputs to the second hash function comprising a second half of the master security key and the first liveness information.

4. The method of claim 1 wherein the first liveness information comprises information selected from the group consisting of: a random value set by the access client, a random value set by the authentication server, and a timestamp.

5. The method of claim 1 wherein deriving a first transient session security key comprises truncating a first master session security key and wherein deriving a second transient session security key comprises truncating a second master session security key.

6. The method of claim 1 wherein deriving a first transient session security key comprises deriving a key selected from the group consisting of: an access-client-to-access-server encryption key, an access-server-to-access-client encryption key, an access-client-to-access-server authentication key, and an access-server-to-access-client authentication key.

7. The method of claim 1 wherein the second function comprises taking an exclusive bit-wise OR of a first hash function and a second hash function, with inputs to the first hash function comprising a first half of the first transient session security key and the second liveness information, and with inputs to the second hash function comprising a second half of the first transient session security key and the second liveness information.

8. The method of claim 1 wherein the second liveness information comprises information selected from the group consisting of: a random value set by the access client, a random value set by the access server, and a timestamp.

9. The method of claim 1 further comprising receiving the second liveness information from the access server.

10. The method of claim 9 further comprising decrypting the received second liveness information using an access-server-to-access-client encryption key derived from the first master session security key.

11. A computer-readable storage medium having at least one tangible physical media and comprising instructions, which, when executed by a processor to perform a method for an access client to communicate with an access server, the access client and an access server being members of a network group, the method comprising:
communicating with an authentication server via the access server to authenticate the access client to the authentication server and establish a master security key known to the access client and the authentication server;
deriving, using at least one first function, a first transient session security key based on the master security key and first liveness information;
communicating with the access server using the first transient session security key;
after communicating with the access server using the first transient session security key, deriving, using at least one second function, a second transient session security key based on the first transient session security key and second liveness information, the second transient session security key being derived without re-authenticating the access client to the authentication server; and
communicating with the access server using the second transient session security key.

12. In a computing environment with a network group, an access client and an access server being members of the network group, a method for the access server to iteratively derive a transient session security key, the method comprising:
communicating with an authentication server and the access client such that the access client authenticates itself to the authentication server via the access server;
receiving, at the access server, a first master session security key;
deriving a first transient session security key from the first master session security key;
running a function, with inputs to the function comprising the first transient session security key and liveness information;
assigning an output of the function to a second master session security key; and
deriving a second transient session security key from the second master session security key.

13. The method of claim 12 wherein deriving a first transient session security key comprises truncating the first master session security key and wherein deriving a second transient session security key comprises truncating the second master session security key.

14. The method of claim 12 wherein deriving a first transient session security key comprises deriving a key selected from the group consisting of: an access-client-to-access-server encryption key, an access-server-to-access-client encryption key, an access-client-to-access-server authentication key, and an access-server-to-access-client authentication key.

15. The method of claim 12 wherein running a function comprises taking an exclusive bit-wise OR of a first hash function and a second hash function, with inputs to the first hash function comprising a first half of the first transient session security key and the liveness information, and with inputs to the second hash function comprising a second half of the first transient session security key and the liveness information.

16. The method of claim 12 wherein the liveness information comprises information selected from the group consisting of: a random value set by the access client, a random value set by the access server, and a timestamp.

17. The method of claim 12 further comprising sending the liveness information to the access client.

18. The method of claim 17 further comprising determining when to send the second liveness information to the access client, the determining based upon a criterion selected from the group consisting of: time since an access-server-to-access-client encryption key was derived from an output of the first function and amount of data sent to the access client encrypted using an access-server-to-access-client encryption key derived from an output of the first function.

19. The method of claim 17 further comprising encrypting the liveness information using an access-server-to-access-client encryption key derived from the first master session security key.

20. A computer-readable storage medium having at least one tangible physical media and comprising instructions, which, when executed by a processor to perform a method for an access server to iteratively derive a transient session security key, an access client and the access server being members of a network group, the method comprising:
communicating with the authentication server and the access client such that the access client authenticates itself to the authentication server via the access server;
receiving, at the access server, a first master session security key; deriving a first transient session security key from the first master session security key;
running a function, with inputs to the function comprising the first transient session security key and liveness information;
assigning an output of the function to a second master session security key; and
deriving a second transient session security key from the second master session security key.

21. In a computing environment with a network group, an access client and an access server being members of the network group, a master security key being known to the access client and to the access server, a method for the access client or the access server to iteratively derive a transient session security key, the method comprising:
running a first function, with inputs to the first function comprising the master security key and identifier information;
assigning an output of the first function to a first master session security key;
deriving a first transient session security key from the first master session security key;

running a second function, with inputs to the second function comprising the first transient session security key and first liveness information;
assigning an output of the second function to a second master session security key;
deriving a second transient session security key from the second master session security key;
communicating between the access client and the access server using the second transient session security key;
after communicating between the access client and the access server using the second transient session security key, running a third function to change the transient session security key that is used for communications between the access client and the access server, with inputs to the third function comprising the second transient session security key and second liveness information;
assigning an output of the third function to a third master session security key;
deriving a third transient session security key from the third master session security key; and
communicating between the access client and the access server using the third transient session security key.

22. The method of claim 21 wherein running a first function, running a second function, and running a third function comprise running the same function.

23. The method of claim 21 wherein running a first function comprises taking an exclusive bit-wise OR of a first hash function and a second hash function, with inputs to the first hash function comprising a first half of the master security key and the identifier information, and with inputs to the second hash function comprising a second half of the master security key and the identifier information.

24. The method-of claim 21 wherein the identifier information comprises a hardware address of the access server concatenated with a hardware address of the access client.

25. The method of claim 21 wherein deriving a first transient session security key comprises truncating the first master session security key, wherein deriving a second transient session security key comprises truncating the second master session security key, and wherein deriving a third transient session security key comprises truncating the third master session security key.

26. The method of claim 21 wherein running a second function comprises taking an exclusive bit-wise OR of a first hash function and a second hash function, with inputs to the first hash function comprising a first half of the first transient session security key and the first liveness information, and with inputs to the second hash function comprising a second half of the first transient session security key and the first liveness information.

27. The method of claim 21 wherein the second liveness information comprises information selected from the group consisting of: a random value set by the access client, a random value set by the access server, and a timestamp.

28. The method of claim 21 wherein deriving a second transient session security key comprises deriving a key selected from the group consisting of: an access-client-to-access-server encryption key, an access-server-to-access-client encryption key, an access-client-to-access-server authentication key, and an access-server-to-access-client authentication key.

29. The method of claim 21 performed on the access client and further comprising receiving the second liveness information from the access server.

30. The method of claim 29 further comprising decrypting the received second liveness information using an access-server-to-access-client encryption key derived from an output of the second function.

31. The method of claim 21 performed on the access server and further comprising sending the second liveness information to the access client.

32. The method of claim 31 further comprising determining when to send the second liveness information to the access client, the determining based upon a criterion selected from the group consisting of: time since an access-server-to-access-client encryption key was derived from an output of the second function and amount of data sent to the access client encrypted using an access-server-to-access-client encryption key derived from an output of the second function.

33. The method of claim 31 further comprising encrypting the second liveness information using an access-server-to-access-client encryption key derived from the second master session security key.

34. A computer-readable storage medium having at least one tangible physical media and comprising instructions, which, when executed by a processor to perform a method for performing a method for an access server or an access client to iteratively derive a transient session security key, the access client and the access server being members of a network group, a master security key being known to the access client and to the access server, the method comprising:
running a first function, with inputs to the first function comprising the master security key and identifier information;
assigning an output of the first function to a first master session security key; deriving a first
transient session security key from the first master session security key;
running a second function, with inputs to the second function comprising the first transient session security key and first liveness information;
assigning an output of the second function to a second master session security key;
deriving a second transient session security key from the second master session security key;
communicating between the access client and the access server using the second transient session security key;
after communicating between the access client and the access server using the second transient session security key, running a third function to change the transient session security key that is used for communications between the access client and the access server, with inputs to the third function comprising the second transient session security key and second liveness information;
assigning an output of the third function to a third master session security key;
deriving a third transient session security key from the third master session security key; and
communicating between the access client and the access server using the third transient session security key.

35. In a computing environment with a network group, an access client and an access server being members of the network group, a method for iteratively deriving a transient session security key, the method comprising:
authenticating the access client to the authentication server by communicating via the access server, the authentication resulting in a master security key known to the access client and the authentication server;

running, on the access client and on the authentication server, a first function, with inputs to the first function comprising the master security key and first liveness information;

assigning, on the access client and on the authentication server, an output of the first function to a first master session security key;

sending, from the authentication server to the access server, the first master session security key;

deriving, on the access client and on the access server, a first transient session security key from the first master session security key;

running, on the access client and on the access server, a second function, with inputs to the second function comprising the first transient session security key and second liveness information;

assigning, on the access client and on the access server, an output of the second function to a second master session security key; and deriving, on the access client and on the access server, a second transient session security key from the second master session security key.

36. The method of claim 35 further comprising:

sending, from the access client to the authentication server, a random value set by the access client; and sending, from the authentication server to the access client, a random value set by the authentication server wherein the first liveness information comprises information selected from the group consisting of: the random value set by the access client, the random value set by the authentication server, and a timestamp.

37. The method-of claim 35 further comprising:

sending, from the access server to the access client, the second liveness information wherein the second liveness information comprises information selected from the group consisting of: a random value set by the access server and a timestamp.

38. The method of claim 37 further comprising:

encrypting, on the access server, the second liveness information using an access-server-to-access-client encryption key derived from an output of the first function; and decrypting, on the access client, the received second liveness information using an access-server-to-access-client encryption key derived from an output of the first function.

39. A computer-readable storage medium having at least one tangible physical media and comprising instructions, which, when executed by a processor to perform a method for iteratively deriving a transient session security key, an access client and an access server being members of a network group, the method comprising:

authenticating the access client to the authentication server by communicating via the access server, the authentication resulting in a master security key known to the access client and the authentication server;

running, on the access client and on the authentication server, a first function, with inputs to the first function comprising the master security key and first liveness information;

assigning, on the access client and on the authentication server, an output of the first function to a first master session security key;

sending, from the authentication server to the access server, the first master session security key;

deriving, on the access client and on the access server, a first transient session security key from the first master session security key;

running, on the access client and on the access server, a second function, with inputs to the second function comprising the first transient session security key and second liveness information;

assigning, on the access client and on the access server, an output of the second function to a second master session security key; and deriving, on the access client and on the access server, a second transient session security key from the second master session security key.

* * * * *